United States Patent
Judet

(10) Patent No.: US 7,246,653 B2
(45) Date of Patent: Jul. 24, 2007

(54) PROCESS FOR MANUFACTURING THE BLADE OF TURBOMACHINE, AND ASSEMBLY OF THE CORES FOR IMPLEMENTATION OF THE PROCESS

(75) Inventor: Maurice Guy Judet, Dammarie les Lys (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/229,704

(22) Filed: Sep. 20, 2005

(65) Prior Publication Data

US 2006/0249275 A1 Nov. 9, 2006

(30) Foreign Application Priority Data

Sep. 21, 2004 (FR) .................................. 04 52111

(51) Int. Cl.
*B22C 9/00* (2006.01)
(52) U.S. Cl. ........................... 164/516; 164/34; 164/35
(58) Field of Classification Search ................ 164/516, 164/34, 35, 361, 369
See application file for complete search history.

(56) References Cited

U.S. PATENT DOCUMENTS

| 5,951,256 | A | 9/1999 | Dietrich |
| 6,255,000 | B1 * | 7/2001 | O'Connor et al. .......... 428/586 |
| 6,286,582 | B1 * | 9/2001 | Chartier et al. ............... 164/28 |
| 6,347,660 | B1 | 2/2002 | Sikkenga et al. |

FOREIGN PATENT DOCUMENTS

EP 1 106 280 A1 6/2001

* cited by examiner

*Primary Examiner*—Kevin Kerns
*Assistant Examiner*—Ing-Hour Lin
(74) *Attorney, Agent, or Firm*—Oblon, Spivak, McClelland, Maier & Neustadt, P.C.

(57) ABSTRACT

A process for manufacturing a blade of a turbomachine using the lost-wax moulding technique, where the blade includes a first central longitudinal cavity and at least one second longitudinal cavity together forming a cooling circuit and communicating with each other at one longitudinal end via a transverse channel. The process includes manufacturing first and second cores corresponding to the cavities, where the two cores each have an end portion, by which they are connected together by an assembly of the mortise and tenon type. The assembly of the two cores is then positioned in a shell mould and the metal poured into the mould.

7 Claims, 3 Drawing Sheets

PROCESS FOR MANUFACTURING THE BLADE OF TURBOMACHINE, AND ASSEMBLY OF THE CORES FOR IMPLEMENTATION OF THE PROCESS

This present invention concerns the area of turbines, and in particular that of the turbines of gas-turbine engines, and covers the manufacture by lost-wax moulding of mobile or stator blades that include cavities intended for the circulation of cooling fluids.

BACKGROUND OF THE INVENTION

The mobile or stator turbine blades, which are subject to high thermal stresses, include resources for cooling by the circulation of a heat-bearing fluid, generally air in the case of a gas-turbine engine, inside cavities created inside the vane.

In addition, the cooled turbine blades are now generally manufactured by the lost-wax moulding process. This technique has several stages. A first stage consists of creating a model of the part that one wishes to mould, in wax or another equivalent material. In a second stage, one then surrounds the model in a shell mould made from a ceramic material. The latter is manufactured by successive soakings of the model in slurries containing a ceramic material, alternating with stucco operations, between the soakings, on the layer formed. When it has been formed, the mould is dried and the wax that it contains is removed by a first firing at a suitable temperature, and then the mould is further fired at a high temperature in order to provide it with the strength necessary for the pouring process. This then leaves the hollow image of the model, into which the molten metal is poured. After cooling, the mould is broken to release the part. The latter is then subjected to a simple finishing process.

When the vane includes cavities for the circulation of a cooling fluid, it is necessary to incorporate one or more cores into the model, before the manufacture of the shell mould. This phase of the process includes firstly the separate manufacture of the core or cores by the moulding of a ceramic material consolidated by a binder, followed by their assembly where necessary, and the positioning of the core or cores inside a wax mould. The said model is thus moulded by the injection of wax into the wax mould. The wax fills the spaces created between the core or the assembly of core elements and the volume of the wax mould. The model obtained in wax forms the replica of the part to be manufactured, with the difference that the internal cavities are occupied by the core or cores.

During the alloy pouring stage, the molten metal flows between the walls of the shell mould and those of the core. After appropriate cooling of the alloy, the shell mould is firstly removed and then the elements constituting the core, in order to produce the cavities. The part finally undergoes a simple finishing process.

The technique presented above allows the creation of parts with complex internal geometries. The patent application in the name of the applicant, FR 0,309,535, filed on 1 Aug. 2003, corresponding to U.S. Pat. No. 7,033,136, describes a turbine blade with several cooling circuits, a first along a central cavity and cavities on the upper and lower surfaces of the vane, with a second that is independent of the first circuit, along the leading edge of the blade, and a third which is independent of the first two, along the trailing edge of the blade.

A high-pressure turbine blade 10 for a gas-turbine engine is shown in FIGS. 1 and 2. The blade includes an aerodynamic surface 12 called a vane, which extends in a radial direction between a blade root 14 and a blade tip 16. The root is shaped so as to allow mounting of the blade on a rotor disk. Here, the tip of the blade has a part said to be in the shape of a bathtub 28. This is composed of a bottom 26 transverse to the vane and a wall forming its edge as an extension to the wall of the vane 12.

FIG. 2 shows the vane in section, slightly enlarged, in the plane II-II of FIG. 1. Here the vane 12 includes a variety of cavities. A first cavity is central 34, and extends from the root up to the tip of the vane. Three cavities 30 are located along the wall of the upper blade surface between the central cavity 34 and the upper blade wall, and along the latter. The cavities 30 are narrow and positioned behind each other along this wall. Two cavities 32 are located between the central cavity and the lower blade surface, and along the latter. These also are narrow. One cavity 50 is located in the part of the blade close to the trailing edge. One cavity 60 is located in the part of the blade close to the leading edge.

FIG. 3 shows a view of the blade in section in the plane III-III of FIG. 2. The cooling air first circulates along the upper-surface and lower-surface cavities and then is routed to the central cavity, to be extracted via openings created appropriately. One or two different circuits feed air into the two cavities labelled 50 and 60.

For the manufacture by moulding of a part with such a structure, cores are created corresponding to the different cavities, in the form of a first core 1 whose shape corresponds to that of the first cavity, a second core 2 whose shape corresponds to the three cavities 30 of the upper blade surface and a third core 3 whose forms corresponds to the two lower-surface cavities 32. Cores are also created for cavities 50 and 60. In the remainder of the presentation however, we will consider only the first three cavities with their associated cores to the extent that they form a single cooling circuit.

FIG. 4 shows a partial view of the tip of the part in its state following the cooling of the metal. It is shown in section in a radial direction, after the shell mould has been removed. The cavities created inside the wall 13 of the blade are occupied by the assembled cores 1, 2 and 3, which now have to be removed.

It can be seen that the three cores have been created so that they can constitute a rigid assembly during the moulding operations. In fact it is important that the different elements should remain in position, and not be disturbed during the pouring of the molten metal in particular. As can be seen in FIG. 4, the three cores fit into the zone at the tip of the blade, at the position where a passage has to be created between the three cavities. They form a compact rigid assembly at this position. The central core 1 includes a part forming the body 1C corresponding to the central cavity 34, a slimmed-down part 1D and a wider head part 1E. The height of the slimmed-down part 1D corresponds more or less to the height of the passage created between the cavities. Core 2 includes a part forming the body 2C, here in three parts, corresponding to the three upper blade surface cavities 30a, 30b, 30c. These three parts 2C are joined at the tip of the blade to an element 2D inserted between parts 1C and 1E of the core 1, resting against part 1D. In like manner, core 3 includes a part forming a body 3C in two elements corresponding to the two lower-surface cavities 32a and 32b. These two elements are connected by an element 3D at the tip of the blade, which is inserted between parts 1C and 1E of core 1, resting against part 1D. This assembly allows the manufacture of the blade by pouring of the molten metal between the shell mould and the cores, thus creating the wanted cavities and passages.

However, as can be seen in FIG. 4, in practice an interstitial space remains between the parts of the cores thus assembled. The molten metal occupies the space left by these parts. This means that after the removal of the cores, there remain flashings B1 to B4. These metal flashings must be removed since they form a location at which cracks appear during operation of the machine on which the part is mounted. They also result in pressure drops in the flow of the cooling fluid inside the blade.

These are therefore removed by chemical or mechanical means. These operations are lengthy and difficult, and their cost is not negligible. Moreover, it is necessary to create a relatively large opening in the transverse wall forming the bottom of the bathtub, through which one introduces the tool used for removal of the flashings. An edge is created along this opening, and this serves as a base for a close-off plate forming the bottom of the bathtub. We have already seen that because of the size of this opening, the plate is prone to collapsing, leading to significant operational disruptions.

SUMMARY OF THE INVENTION

The subject of this present invention is therefore a process for the manufacture of a mobile or stator turbomachine blade which is free of the drawbacks mentioned above.

According to the invention, the process for manufacturing the blade of a turbomachine using the lost-wax moulding technique, where the blade includes a first longitudinal cavity, central in particular, and at least one second longitudinal cavity, together forming a circuit for cooling and communicating with each other at one longitudinal end of the blade via a transverse channel, where the process includes the manufacturing stage of a first and second core corresponding to the said cavities, where the two cores each have an end portion by which they are connected together, and where the assembly of the two cores is then positioned in a shell mould and the metal poured into the said mould, is characterised by the fact that the said end portions are attached to each other by an assembly of the tenon and mortise type, where the tenon and the mortise are created by machining of the said end portions.

The cores are created by the injection of a ceramic material into an appropriate mould, but the manufacturing tolerances do not allow assembly without parasitic interstices into which the metal is forced. The process of the invention, by machining of the parts to be assembled, guarantees a precision that reduces the said interstices. The machining is effected mechanically by any appropriate tool.

Using a mortise and tenon joint, a mechanical link is created between the two parts, by which they can be held together. Preferably, this connection includes at least one female part on a part that fits together with a male part on the other part. It is these parts, which fit together in the mechanical connection, that are machined in order to allow precise positioning of the parts.

According to another characteristic, where necessary, the residual interstices between the said end portions when they have been assembled, and which are liable to give rise to flashings on the poured metal, are plugged. This plugging is effected advantageously with a mastic of ceramic material.

According to a preferred method of implementation, the mortise, or female part, is formed by machining the end portion of the first central core. A tenon is machined, whose shape corresponds to the said mortise, in the end portion of the second core.

The mechanical connection can include several parts forming mortises and the corresponding tenons.

More precisely, where the blade includes at least a third longitudinal cavity, with the said second and thirds cavities being located with one between the central cavity and the upper blade surface and the other between the central cavity and the lower blade surface, the process includes a manufacturing stage for a third core corresponding to the said third cavity.

According to a particular method of implementation, at least one of the second and third cavities is composed of at least two parallel cavities forming two parallel portions of the cooling circuit, and the corresponding core includes a number of parallel branches identical to the number of parallel cavities.

According to another characteristic, they communicated with each other via their ends located at the tip end of the blade.

The invention also covers the assembly of the cores as such, for implementation of the process according to one of the preceding claims, whose different cores are connected together at one end, including the end with the parts for mounting in a mould.

BRIEF DESCRIPTION OF THE DRAWINGS

The invention will be understood better, and other characteristics will appear, on reading the description that follows, with reference to the appended drawings, in which:

Referring to FIGS. 5 to 8, representing the assembly of the cores of the invention, we see the top part of the core 100 with a body 100C and an end portion 100D—see FIG. 6 in particular. The body 100C of the core has the shape of the central cavity 34 shown in FIG. 1. The end portion 100D is edged, on its upper blade surface, by three beads 100Da, 100Db and 100Dc, with dimensions that are determined by the dimensions of the passages that are to be created between firstly the central cavity and secondly each of the three upper blade surface cavities 30a, 30b and 30c of the blade. Bead 100Da is close to the leading edge and bead 100Dc is close to the trailing edge. The core has been moulded by the injection into a mould of a ceramic material that is appropriate for this application. The core 100 is then prepared by machining a mortise 100Dam, 100Dbm and 100Dcm in each of the three beads respectively, open in the direction parallel to the axis of the blade, with the lateral edges also in this direction.

FIG. 7 is a view in perspective of a core 200, here at the upper blade surface, with three branches 200a, 200b and 200c whose blade shapes correspond in each case to an upper blade surface cavity 30a, 30b and 30c respectively. The bottom part of the core includes elements created by moulding and which have the function of retaining the core during the different operations of blade formation. The tip of each blade branch includes a tenon 200at, 200bt and 200ct respectively, forming the end portion of the core 200. The tenons have been machined, in the core created by moulding, by means of an appropriate tool available to the professional engineer. The dimensions of the tenons are thus precise.

DETAILED DESCRIPTION OF AN EMBODIMENT

Figure 1:
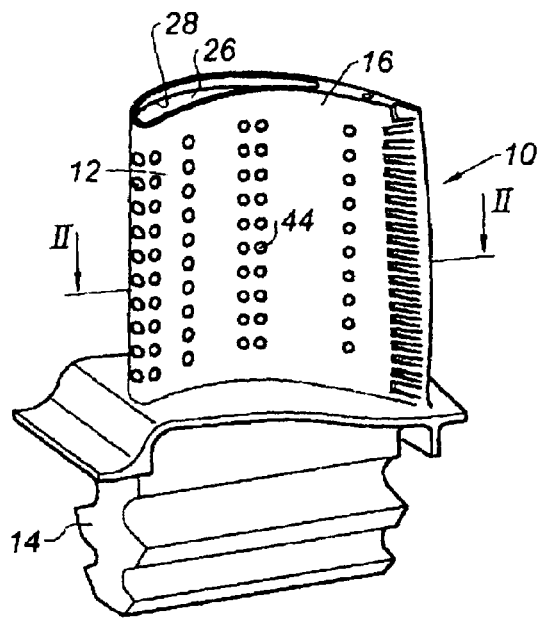
FIG. 1 shows a turbine blade in perspective view.
Figure 9:
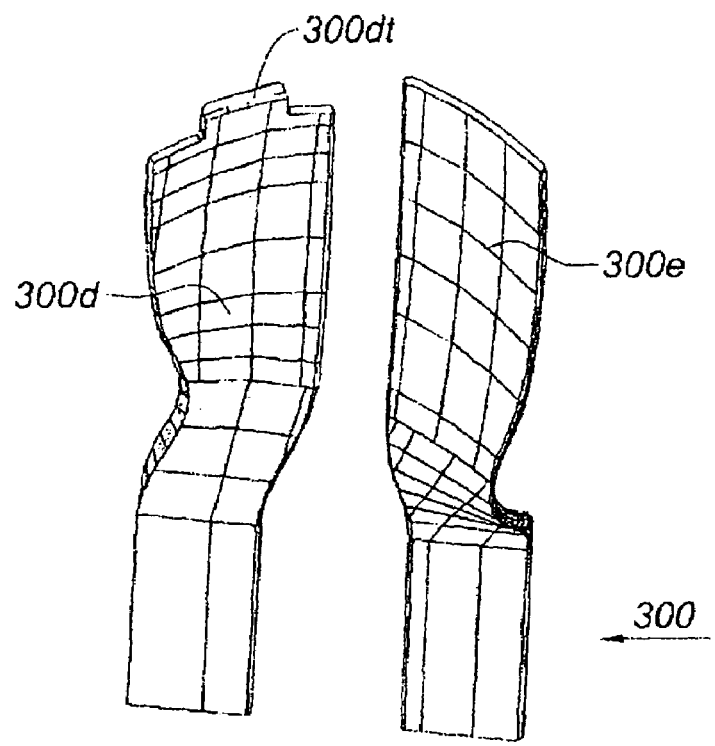
FIG. 9 shows the lower blade surface core of FIG. 5 with its two branches.

For the implementation example of the blade in FIG. 1, which also includes upper-surface cavities 32d and 32e, a lower blade surface core 300 is created with two branches 300d and 300e in the shape of these cavities. This has been illustrated in FIG. 9. As for the core 300, a tenon 300dt has been machined on at least one of the branches. In FIG. 9, it can be seen that a tenon has been created on branch 300d. Likewise, the core 100 includes a bead 100Dd at the end part 100D of its lower surface. A mortise 100Ddm has been machined in the bead 100Dd, just as in the beads of the upper blade surface, to receive the tenons created at the tip of at least one of the branches 300d and 300e of the core 300.

To assemble the three cores, core 200 is placed beside the upper surface of core 100, by sliding the tenons, 200at, 200bt and 200ct respectively into the mortises 100Dam, 100Dbm, 100Dcm associated with them. Then core 300 is placed beside the lower surface of core 100 by sliding tenons 300dt and 300et into the mortise of the bead associated with it.

Figure 5:
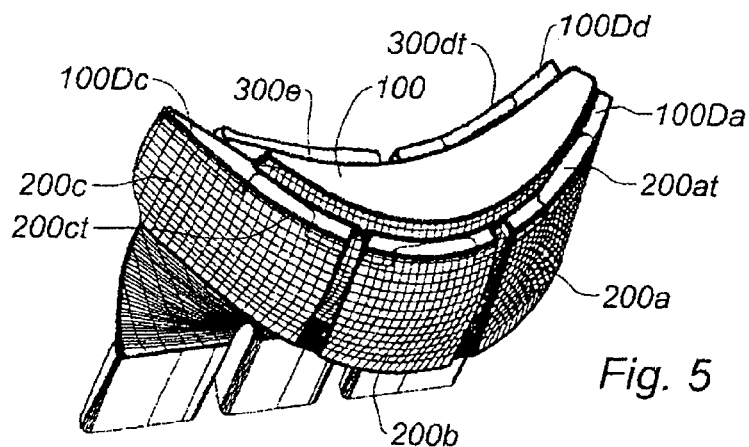
FIG. 5 is a view in perspective of the assembly of the three cores according to the invention.
Figures 6, 7:
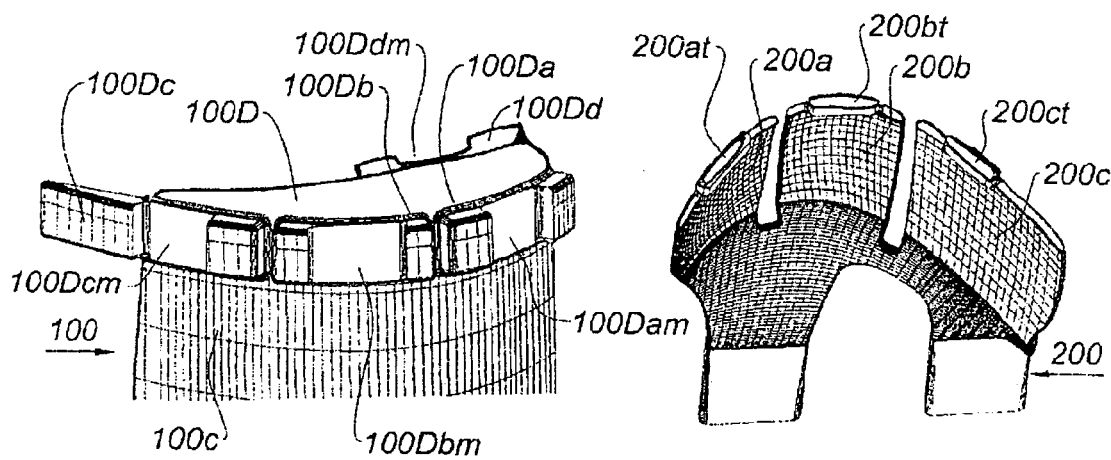
FIG. 6 shows the tip of the central core of FIG. 5, alone and in perspective.
FIG. 7 shows the upper blade surface core of FIG. 5, alone and in perspective.
Figure 8:
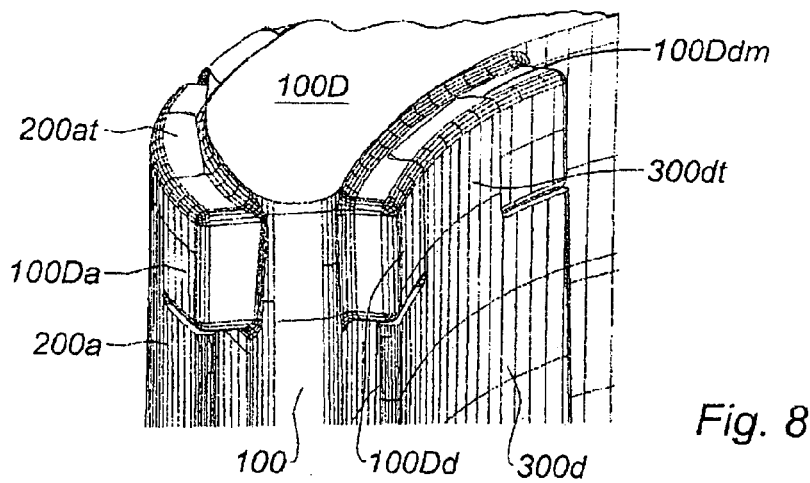
FIG. 8 shows the tip of the cores of FIG. 5 in greater detail.

The overall result of this assembly process is shown in FIG. 5, with a partial enlarged view of the end portion in FIG. 8. In the latter figure, we see that some zones remain to be plugged in order to obtain a surface that is as continuous as possible with no residual space. For example, in the implementation shown in this figure, the tenon 300dt, machined on the tip of branch 300d of the core, is slotted into mortise 100Ddm machined in bead 100Dd on the lower surface of core 100. Using an appropriate material, such as a ceramic mastic, the residual space that exists between the two shoulders located on either side of the tenon 300dt, and the lower face of bead 100Dd will then be plugged. There may also be some space between tenon 300dt and the edges of mortise 100Ddm, which will also have to be plugged.

In this figure, we also see the residual space between the shoulder of the tip of branch 200a, which rests against the lower face of bead 100Da on the upper surface of the core.

This arrangement has an additional advantage concerning the tip of the blade. It is possible to arrange the exit of the central core into the bathtub so that its surface area is small. The result is that one then avoids the problems associated with any collapse of the plate constituting the bottom of the bathtub and closing off the cooling circuit.

By so preventing the formation of flashings, we also ensure a optimal flow inside the circuit with no pressure drops.

Figure 10:
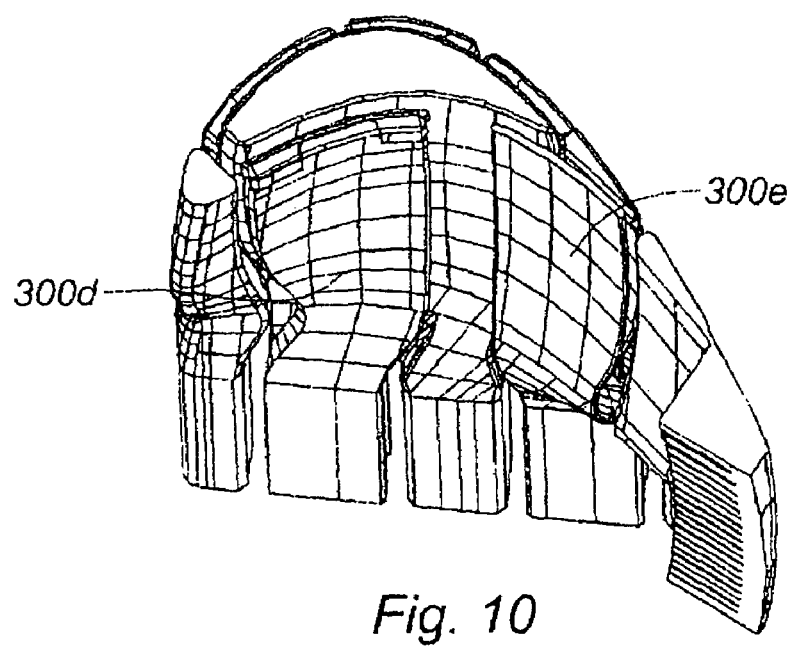
FIG. 10 shows the complete core assembly, as seen from the lower blade surface.

FIG. 10 shows the complete assembly with all of the core elements, as seen from above and from the lower surface side. One can identify the cores corresponding to cavities 50 and 60 of FIG. 2.

Figure 2:
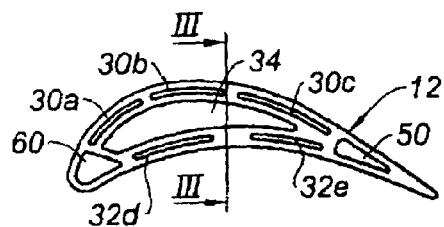
FIG. 2 shows an enlarged section in the plane II-II of FIG. 1.
Figure 3:
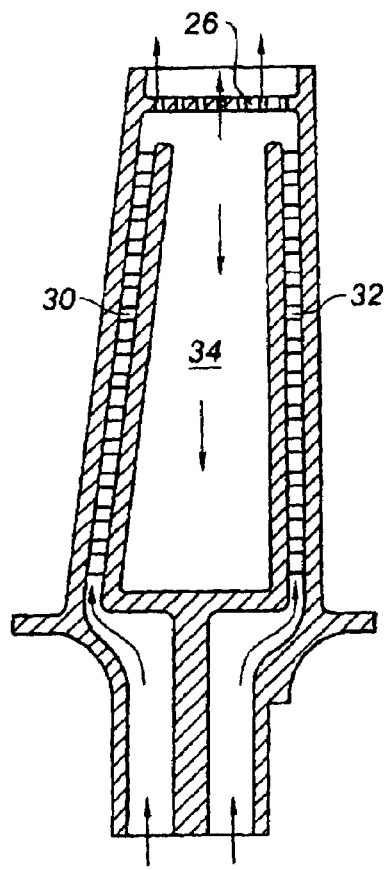
FIG. 3 shows an enlarged section in the plane III-III of FIG. 2.
Figure 4:
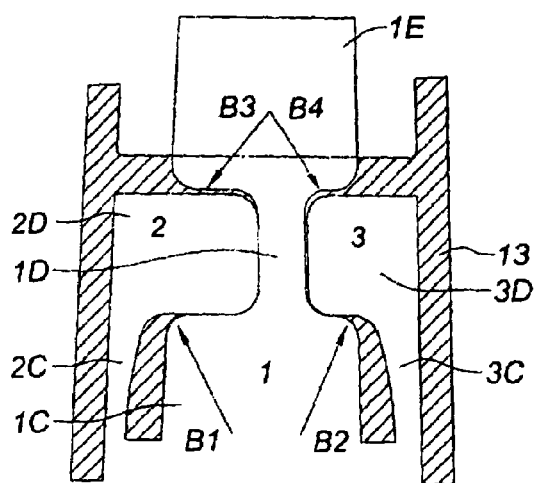
FIG. 4 shows and enlarged longitudinal view in section of part of the tip of the vane before elimination of the cores in the process employed by previous designs.

This has been a description of the invention in relation to the example of implementation of a cooling circuit as illustrated in FIG. 2, but the invention is not limited to this implementation only, and applies also to the assembly in general of cores for the formation of a fluid circuit inside a blade.

The invention claimed is:

1. A process for manufacturing a blade for a turbomachine, wherein the blade includes a first central longitudinal cavity and a second longitudinal cavity, which together form a cooling circuit by communicating with each other at one longitudinal end of the blade via a transverse channel, the process comprising the steps of:
   manufacturing first and second cores corresponding to the cavities, where the two cores each have an end portion, by which they are connectable together by a mortise and tenon type connection;
   connecting the first core to the second core via said mortise and tenon type connection to form an assembly of the two cores having residual spaces formed by the mortise and tenon type connection, such residual spaces being liable to give rise to flashings on the poured metal if not plugged;
   plugging residual spaces formed by the mortise and tenon type connection in the assembly of the two cores to form a plugged assembly of the two cores;
   positioning the plugged assembly of the two cores in a shell mould; and
   pouring metal into the mould to form a blade for a turbomachine.

2. A process according to claim 1, wherein ceramic mastic is used to plug residual spaces formed by the mortise and tenon type connection in the assembly of the two cores.

3. A process according to claim 1, wherein the first core corresponds to the first central longitudinal cavity and further including the step of machining the end portion of the first core with a mortise.

4. A process according to claim 3, further including the step of machining the end portion of the second core with a tenon corresponding to the mortise machined on the first core.

5. A process according to claim 1, wherein the blade further includes a third longitudinal cavity and the second and third cavities are located with one between the first central longitudinal cavity and an upper blade surface and the other between the first central longitudinal cavity and a lower blade surface and further including the step of manufacturing a third core corresponding to the third cavity.

6. A process according to claim 5, wherein at least one of the second and third cavities is composed of at least two parallel longitudinal cavities, forming two parallel portions of the cooling circuit and further including the step of manufacturing the corresponding core to include a number of parallel branches identical to the number of parallel longitudinal cavities.

7. A process according to claim 1, wherein the cavities communicate with each other by their ends located beside the tip of the blade.

* * * * *

UNITED STATES PATENT AND TRADEMARK OFFICE
CERTIFICATE OF CORRECTION

| | | |
|---|---|---|
| PATENT NO. | : 7,246,653 B2 | Page 1 of 1 |
| APPLICATION NO. | : 11/229704 | |
| DATED | : July 24, 2007 | |
| INVENTOR(S) | : Maurice Guy Judet | |

It is certified that error appears in the above-identified patent and that said Letters Patent is hereby corrected as shown below:

On the Title page of the patent, please amend the title as follows:
Should read;

--PROCESS FOR MANUFACTURING THE BLADE OF A TURBOMACHINE, AND ASSEMBLY OF THE CORES FOR IMPLEMENTATION OF THE PROCESS--

Signed and Sealed this

Fifteenth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,246,653 B2
APPLICATION NO. : 11/229704
DATED : July 24, 2007
INVENTOR(S) : Maurice Guy Judet It is certified that error appears in the above-identified patent and that said Letters Patent is hereby corrected as shown below:

On the Title page of the patent, Item [54] and Column 1, lines 1-4 please amend the title as follows:
Should read;

--PROCESS FOR MANUFACTURING THE BLADE OF A TURBOMACHINE, AND ASSEMBLY OF THE CORES FOR IMPLEMENTATION OF THE PROCESS--

This certificate supersedes the Certificate of Correction issued April 15, 2008.

Signed and Sealed this

Sixth Day of May, 2008

JON W. DUDAS
*Director of the United States Patent and Trademark Office*